(12) United States Patent
Coldrey et al.

(10) Patent No.: US 11,108,455 B2
(45) Date of Patent: Aug. 31, 2021

(54) ANTENNA GEOMETRIES FOR IMPROVED MIMO COMMUNICATION

(71) Applicant: Telefonaktiebolaget LM Ericsson (publ), Stockholm (SE)

(72) Inventors: Mikael Coldrey, Borås (SE); Lei Bao, Gothenburg (SE); Jonas Hansryd, Gothenburg (SE); Martin Johansson, Mölndal (SE); Christina Larsson, Mölndal (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/977,576

(22) PCT Filed: Apr. 24, 2018

(86) PCT No.: PCT/EP2018/060446
§ 371 (c)(1),
(2) Date: Sep. 2, 2020

(87) PCT Pub. No.: WO2019/206402
PCT Pub. Date: Oct. 31, 2019

(65) Prior Publication Data
US 2021/0013946 A1 Jan. 14, 2021

(51) Int. Cl.
*H04B 7/06* (2006.01)
*H04B 7/0413* (2017.01)

(52) U.S. Cl.
CPC ......... *H04B 7/0691* (2013.01); *H04B 7/0413* (2013.01); *H04B 7/0613* (2013.01)

(58) Field of Classification Search
CPC ... H04B 7/0413; H04B 7/0613; H04B 7/0691
See application file for complete search history.

(56) References Cited

U.S. PATENT DOCUMENTS

| 7,948,444 | B2 | 5/2011 | Signell et al. | |
|---|---|---|---|---|
| 2008/0026697 | A1 | 1/2008 | Signell et al. | |
| 2014/0243043 | A1 | 8/2014 | Shen et al. | |
| 2016/0119018 | A1 | 4/2016 | Lindgren et al. | |
| 2016/0380707 | A1* | 12/2016 | Olsson | H04B 7/0413 |
| | | | | 342/359 |
| 2018/0152325 | A1* | 5/2018 | Frank | H04W 24/02 |

FOREIGN PATENT DOCUMENTS

WO 2017186301 A1 11/2017

* cited by examiner

*Primary Examiner* — David B Lugo
(74) *Attorney, Agent, or Firm* — Coats & Bennett, PLLC (57) ABSTRACT

A method for selecting a geometry of an antenna array in a multiple-input multiple-output, MIMO, radio communication system (100), the method comprising; obtaining a first parameter set comprising a first communication distance $D_1$ and a first carrier frequency $f_1$, and a second parameter set comprising a second communication distance $D_2$ and a second carrier frequency $f_2$, determining a first radio communication performance measure based on the first parameter set in dependence of antenna array geometry, and a second radio communication performance measure based on the second parameter set in dependence of antenna array geometry, and selecting the antenna array geometry based on the first radio communication performance measure and on the second radio communication performance measure.

19 Claims, 8 Drawing Sheets

ANTENNA GEOMETRIES FOR IMPROVED MIMO COMMUNICATION

TECHNICAL FIELD

The present disclosure relates to methods for selecting a geometry of an antenna array in a multiple-input multiple-output (MIMO) radio communication system. There are also disclosed herein antenna arrays and systems configured for improved MIMO communication, as well as configuration devices for supporting deployment of point-to-point radio link systems.

BACKGROUND

Line-of-Sight (LOS) Multi-Input Multi-Output (MIMO) technology offers significantly increased data transmission throughput in line-of-sight point-to-point radio links, compared to conventional single antenna radio links. This type of MIMO system relies on a carefully selected antenna geometry, i.e., relative placement of transmit and receive antennas, to enable MIMO communication over a radio channel which is not diverse in the sense that it comprises significant reflections. LOS-MIMO systems are known from, e.g., U.S. Pat. No. 7,948,444 B2.

Backhaul refers to the connection between an access point, such as a radio base station in a cellular communication system, and a core network. As data traffic in communication networks increase, increased throughputs are required by point-to-point microwave radio links used in such backhaul applications. Thus, there is a need to increase throughput of line-of-sight systems beyond that provided by conventional LOS-MIMO systems.

Reliability in terms of low outage is an important factor when designing backhaul systems using point-to-point microwave links. Fading due to, e.g., rain and snow may pose reliability problems, especially at higher carrier frequencies.

Link obstruction, i.e., when an object blocks the line-of-sight radio channel is potentially also a problem in point-to-point communication. There is a need for reliable high throughput backhaul systems which are resilient to fading and link obstruction.

SUMMARY

It is an object of the present disclosure to provide improved communication systems, and to address at least some of the deficiencies in the art mentioned above.

This object is obtained by a method for selecting a geometry of an antenna array in a multiple-input multiple-output (MIMO) radio communication system. The method comprises obtaining a first parameter set comprising a first communication distance $D_1$ and a first carrier frequency $f_1$, and a second parameter set comprising a second communication distance $D_2$ and a second carrier frequency $f_2$. The method also comprises determining a first radio communication performance measure based on the first parameter set in dependence of antenna array geometry, and a second radio communication performance measure based on the second parameter set in dependence of antenna array geometry, and selecting the antenna array geometry based on the first radio communication performance measure and on the second radio communication performance measure.

This way the MIMO system is arranged with an antenna array geometry configured for more than one parameter set comprising a distance and a carrier frequency. Compared to known LOS-MIMO systems which are only configured for a single distance and a single carrier frequency, the disclosed antenna geometry can be optimized for two different carrier frequencies at the same time, or for two different distances at the same time, or for two different distances and two different carrier frequencies at the same time. The disclosed method thereby provides increased throughput and/or reliability in point-to-point radio links.

According to some aspects, the antenna array geometry comprises an antenna separation distance ($d_t$, $d_r$). According to some such aspects, in general, the antenna array geometry specifies the relative locations of transmit and receive antennas of the communication system. Thus, by adjusting a single deployment parameter, i.e., the antenna separation in a given dimension, the system can be arranged for operation at two different carrier frequencies at the same time, or for two different distances at the same time, or for two different distances and two different carrier frequencies at the same time. It is, however, appreciated that the disclosed concepts are also applicable for more general antenna array geometries which are not possible to parameterize using a single parameter.

According to aspects, the first communication distance $D_1$ is different from the second communication distance $D_2$. According to such aspects, the antenna geometry is configured to support two or more different distances at the same time, unlike conventional LOS-MIMO systems which are configured to only support a single communication distance.

Thus, a LOS MIMO antenna deployment can be designed with two communication paths in mind. This configuration can then work well regardless of if the Line-of-sight path is clear or in a blocked state, since an alternative communication path has been configured. When the line-of-sight path is blocked, the MIMO system can retain or establish an alternative Non-Line-of-Sight (NLOS) communication channel exploiting the surrounding structures for example diffraction and reflection paths, as will be discussed in more detail below. The new design efficiently utilizes the propagation condition of the environment to improve the robustness of the MIMO link against temporary blockage of the LOS channel. Thereby the availability and data throughput can be significantly improved.

The two different communication distances can be configured at the same carrier frequency, i.e., $f_1=f_2$, or for different carrier frequencies.

According to aspects, the obtaining comprises identifying a first non-line-of-sight (NLOS) communication path, wherein the first communication distance $D_1$ corresponds to the path length of the first NLOS communication path.

In conventional known LOS MIMO planning procedures, the optimal antenna separation is calculated only based on the carrier frequency, and LOS path length. Such procedures are described in, e.g., U.S. Pat. No. 7,948,444 B2. According to the methods and design procedures described herein, the antenna separation or antenna geometry will also take the NLOS path length into consideration. Depending on the characteristics of the disturbance, the in antenna coordinates will be selected according to a trade-off to balance LOS MIMO performance over the first path and NLOS MIMO performance over the second path. The disclosed optimization methods can be used to design antenna separations for fixed installations. Optionally, however, the antenna positions are adjustable (mechanically or electrically) within a certain range to allow for adjusting antenna geometry within a range of geometries.

According to aspects, the obtaining comprises identifying a second (NLOS) communication path, wherein the second communication distance $D_2$ corresponds to the path length of the second NLOS communication path. Thus, the antenna geometry is configured for two different path lengths, both being NLOS communication paths.

According to aspects, the obtaining comprises identifying a line-of-sight communication path, wherein the second communication distance $D_2$ corresponds to the path length of the LOS communication path. Thus, the antenna geometry is configured for two different path lengths, where one path is NLOS and another path is LOS.

According to aspects, the first carrier frequency $f_1$ and the second carrier frequency $f_2$ are different carrier frequencies corresponding to different communication frequency bands.

The two different carrier frequencies can be configured for the same communication distance, i.e., for $D_1=D_2$, or for different communication distances, according to different aspects. This type of multi frequency LOS MIMO system combines the propagation properties of the lower frequency band with the channel bandwidths that are often available at the higher frequency bands. Thereby, the availability and data throughput of the communication system can be significantly improved. Optionally, the use of a dual-band antenna supporting both frequency bands in one antenna module makes it possible to deploy a compact system, which is an advantage.

According to aspects, the selecting comprises selecting a range of an adjustable antenna geometry. Thus, there is provided a degree of flexibility in adjusting the antenna geometry to, e.g., installation scenario.

Apart from the above methods, there is also provided herein configuration devices, antenna arrays, and computer programs comprising computer program code corresponding to the methods. The devices, antenna arrays, and computer programs display advantages corresponding to the advantages already described in relation to corresponding above-mentioned methods.

BRIEF DESCRIPTION OF THE DRAWINGS

The present disclosure will now be described in more detail with reference to the appended drawings, where.

DETAILED DESCRIPTION

Aspects of the present disclosure will now be described more fully with reference to the accompanying drawings. The different devices, computer in programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Herein, line-of-sight (LOS) multiple-input multiple-output (MIMO) communication systems are discussed. These systems will be exemplified by point-to-point microwave radio links. It is, however, appreciated that the disclosed concepts are general in nature and can be applied also in other types of LOS-MIMO systems, i.e., operating at frequencies other than microwave frequencies.

Figure 1:
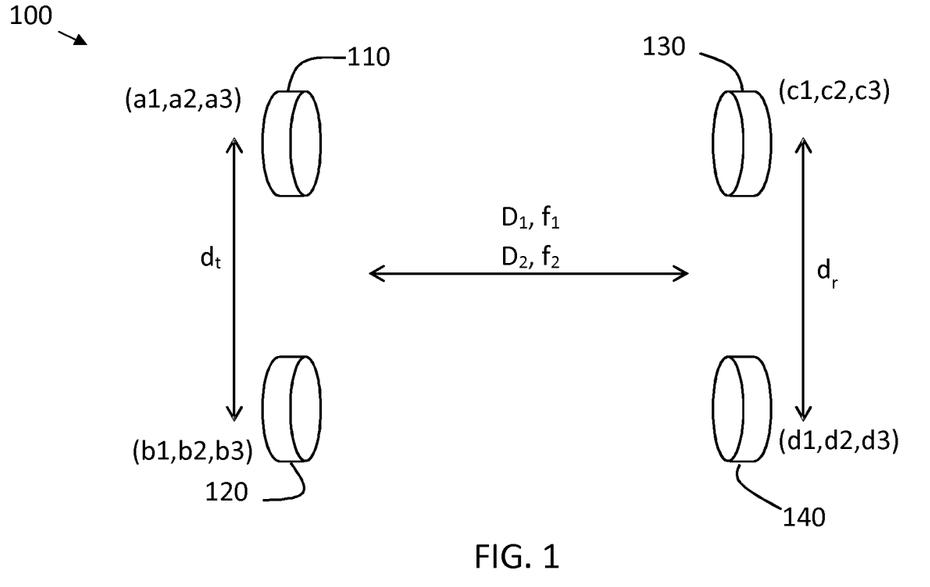
FIG. 1 shows a schematic view of a communication system.

FIG. 1 shows a schematic view of a MIMO communication system 100, such as a LOS MIMO system. A LOS MIMO system enables spatial multiplexing, i.e., MIMO operation, by selecting the antenna geometry such that the transmission channel between the first and the second antenna array allows MIMO operation.

LoS-MIMO technology offers the possibility to significantly increase the transmission throughput of point-to-point microwave radio links by multiplexing multiple streams over the same carrier frequency, or transmission frequency band. This type of MIMO system typically uses highly directive antennas and operates in Line-of-sight conditions.

Figure 2:
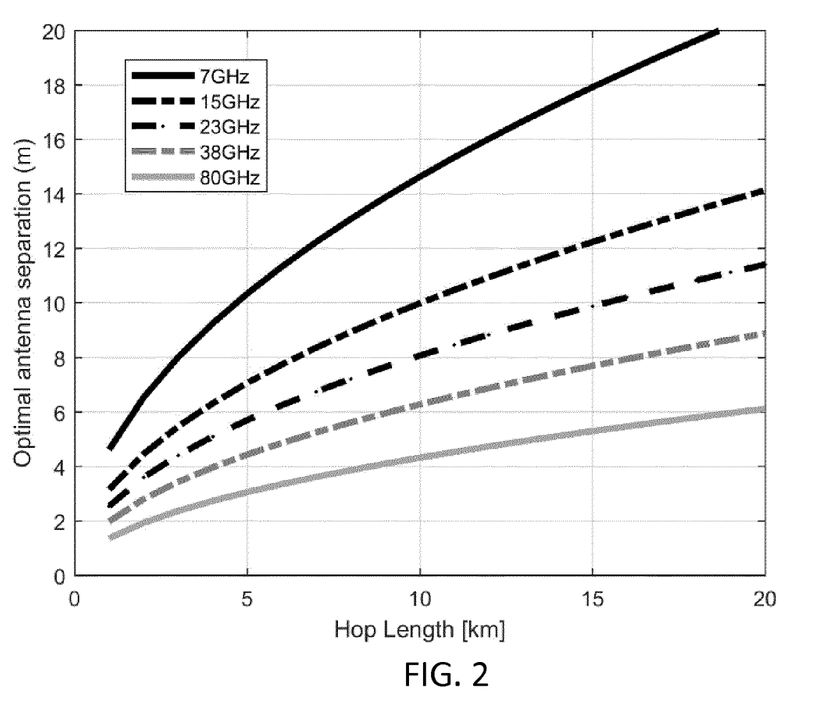
FIG. 2 is a graph showing antenna separation as function of hop length.

A well-conditioned MIMO channel relies on phase shifts given by properly designed antenna separation. In general, optimal antenna separation increases with increasing hop length and decreasing carrier frequency. FIG. 2 illustrates example optimal antenna separations in meters as function of hop length at different carrier frequencies.

LOS-MIMO systems operating at a single carrier frequency over a single LOS in distance are known from, e.g., U.S. Pat. No. 7,948,444 B2.

With reference to FIG. 1, a first antenna array comprising two antennas 110, 120 is arranged for communication with a second antenna array comprising two antennas 130, 140. The antennas are located at coordinates a1,a2,a3, b1,b2,b3, c1,c2,c3, and d1,d2,d3. The set of antenna coordinates constitute the antenna geometry of the MIMO communication system 100. Antenna separation distances $d_t$, $d_r$, can for instance be derived from the set of coordinates. Also, line-of-sight distances between individual antenna elements on transmit and receive sides of the communication system can be derived from the coordinates.

It is appreciated that the concepts described here are applicable also for larger antenna arrays comprising more than two antenna elements.

The LOS MIMO system shown in FIG. 1 is arranged for communication over a first communication distance $D_1$ and a first carrier frequency $f_1$. This means that the antenna geometry, i.e., antenna coordinates, are selected to enable MIMO communication given the first communication distance $D_1$ and the first carrier frequency $f_1$. Given a symmetric antenna configuration, a single communication distance and two antenna separation distances are sufficient to describe the antenna geometry. However, other antenna geometries require a more complex description comprising, e.g., the coordinates of the individual antenna elements.

As noted above, LOS MIMO systems arranged for communication over a single distance at a single carrier frequency, i.e., in a single frequency band, are known. However, the LOS MIMO system shown in FIG. 1 is also arranged for communication over a second communication distance $D_2$ and a second carrier frequency $f_2$, in addition to the first communication distance $D_1$ and the first carrier frequency $f_1$. How this is achieved will be discussed below in detail.

Since the MIMO system shown in FIG. 1 is configured for operation at two different parameter sets at the same time, advantages are obtained. For in instance, in case $D_1$ corresponds to a LOS path, then $D_2$ can be selected as an NLOS path, thereby allowing for a backup communication path in case the LOS path becomes blocked. In a real network, it is not unusual that a well-planned (with good clearance) microwave link is degraded by temporary disturbances such as moving vehicles, construction cranes etc., which is not considered by the regular planning tool.

The capacity for the mobile broadband backhaul will continue to increase with the arrival of 5G. In order to achieve 40 Gbps, even 100 Gbps, there are different technologies that need to be used together in order to satisfy requirements, for example to make good use of the available spectrum at higher frequencies (E-band, D-band), and to exploit multi carrier and more antennas (dual polarization, spatial multiplexing). In general, the hop length of links above 10 GHz is limited by rain attenuation which increases rapidly with the carrier frequency.

The concept of multi-band booster was introduced to increase the hop length of a high frequency link without degrading the availability too much. The idea with the multi-band booster concept is to combine a high frequency radio link (typically 70-80 GHz) with a lower frequency radio link with a carrier frequency in conventional frequency bands, e.g., below 30 GHz. Most of time it is no problem to run the high frequency link over a long distance. However, in case of heavy rain or snowfall, the transmission data will be sent over the low frequency link which is less sensitive to rain fading. This way an increased reliability is obtained. The installation can employ two separate antennas or use a dual-band antenna which operates on the both frequencies simultaneously.

With reference again to FIG. 1, $f_1$ can be selected as a carrier frequency which is more resilient to rain fading, while $f_2$ can be a different carrier frequency selected in a frequency range offering large bandwidth for increased throughput. Thus, by using the techniques disclosed herein, LOS-MIMO can be applied also in a multi-band booster system, since the LOS-MIMO system can be designed for simultaneous operation at two different carrier in frequencies.

Thus, FIG. 1 illustrates an antenna array 110, 120 for a multiple-input multiple-output, MIMO, radio communication system 100. The antenna array is arranged for radio communication over a first communication distance $D_1$ at a first carrier frequency $f_1$, and over a second communication distance $D_2$ at a second carrier frequency $f_2$. A geometry of the antenna array is selected based on a first radio communication performance measure and on a second radio communication performance measure, wherein the first radio communication performance measure is determined based on the first communication distance $D_1$ and on the first carrier frequency $f_1$, and the second radio communication performance measure is determined based on the second communication distance $D_2$ and on the second carrier frequency $f_2$.

A detailed description of the proposed solutions using an example of a 2×2 spatially separated LOS MIMO system will now be given. The same principle can, however, be applied to higher-order dual polarization systems.

In planning of conventional single-band LOS MIMO links, the optimal antenna separation, or antenna geometry in case of more general antenna deployments, is specified at least in part by the carrier frequency in Hz and the length in meters of the LOS path. There are a variety of performance measures which can be used to characterize the optimality of a MIMO channel and an antenna geometry. For example; MIMO channel capacity, e.g., in terms of bps/Hz, MIMO channel conditional number which is unitless, and MIMO phase difference in degrees or radians can all be used to characterize optimality of a MIMO system. At optimal antenna separation, or for an optimal antenna geometry in general, the channel capacity is maximized, the channel condition number is 1 and the MIMO phase difference for the 2×2 system is 0 degrees.

A backhaul radio link has high availability requirement. The fading margin (FM) for a LOS MIMO system can be written as $$FM_{\{LOS\}} = P_{\{t\}} + G_{\{t\}} + G_{\{r\}} - FSL_{\{LOS\}} - P_{\{rt\}} + MIMO \text{ power gain}$$

$P_{\{t\}}$: transmitted power (dBm)
$P_{\{rt\}}$: receiver threshold (dBm)
$G_{\{t\}}$, $G_{\{r\}}$: transmitter and receiver antenna gain (dBi)
FSL: free space loss (dB)

Figure 3:
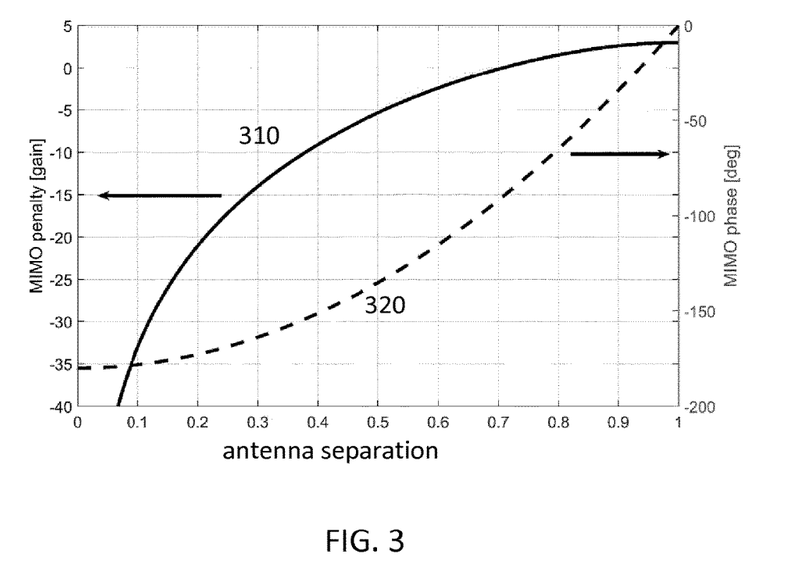
FIG. 3 is a graph showing MIMO penalty as function of antenna separation.

Here, we refer MIMO power gain to the combined power gain after interference cancellation in a MIMO system compared to a SISO system. However, the MIMO gain power reduces as the antenna separation deviates from the optimal value. FIG. 3 shows this MIMO penalty as the solid curve 310, or the decrease in MIMO gain, in dB, as the antenna separation deviates from the optimal value 1. The antenna separation value on the x-axis in FIG. 3 is given in fractions of the optimal antenna separation distance, i.e., the optimal geometry is to the right, 50% of the optimal antenna separation distance is in the middle, and no antenna separation at all is shown in the left. FIG. 3 also shows MIMO phase in degrees as the dashed curve 320 for the same antenna separations.

As discussed in connection to FIG. 1 above, the geometries of the antenna arrays in a MIMO radio communication system 100 can be selected not only based on a single communication distance and on a single carrier frequency, but on a plurality of communication distances $D_1$, $D_2$ and/or on a plurality of carrier frequencies $f_1$, $f_2$, or carrier frequency bands.

A detailed description of the selecting based on more than one distance will now be given, followed by a detailed description of the selecting based on more than one carrier frequency. It is appreciated that the selecting based on more than one distance can be combined with the selecting based on more than one carrier frequency.

According to aspects, in conventional LOS MIMO planning prior to deployment of LOS MIMO radio links, the optimal antenna separation is calculated based on a single carrier frequency, and on a single LOS path length. In the proposed design, however, the antenna separation will, according to aspects, also take in an additional path length, such as an NLOS path length, into consideration. Thereby, two communication paths become available, which means that communication can be maintained even if one path is blocked or somehow degraded.

Figure 4:
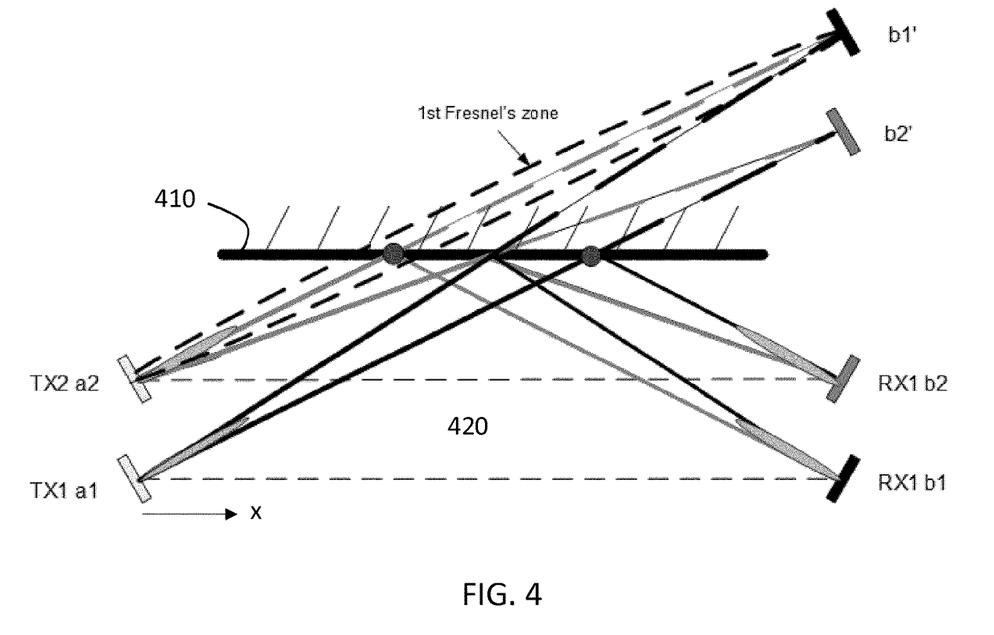
FIG. 4 shows a schematic view of a communication system.

The NLOS path length and the MIMO phase can be calculated using the equivalent LOS MIMO system as shown in FIG. 4. In FIG. 4, a1 and a2 represent two transmit (TX) antennas in a first antenna array, whilst b1 and b2 represent two receive (RX) antennas in a second antenna array. The four antennas will communicate using a NLOS wall reflection path via a reflective wall 410 in addition to or as an alternative to the LOS path 420. The equivalent LOS MIMO system has the RX antennas b1' and b2' which are the mirror images of b1 and b2 with respect to the reflecting wall 410. In the NLOS configuration, the TX antennas shall have the beam directions pointing to the mirror images of the RX antennas, b1' and b2'. The NLOS MIMO system has similar channel characteristics, such as path length, MIMO phase, MIMO deployment loss, channel condition number etc., as the equivalent LOS MIMO system.

The reflection loss depends on the material of the reflector and the incidence angle. The values of typical reflection surface such as wood, metal, glass etc., can be found in literature. They commonly vary from 3 dB to 18 dB.

As a specular reflection is preferred, the reflection surface preferably fulfills the law of reflection i.e. the surface is preferably such that the angle of incident wave is the same as the angle of the reflected wave. Optionally, this puts requirement on where the surface is located, and the angle of the surface seen from the antennas.

To ensure equal RX power between different paths from the same TX antennas, the boresight angles from a1, a2 to b1' and b2' is preferably small. This is already a preference for the angle between a1-b1 and a1-b2 and the angle between a2-b1 and a2-b2 as that is the standard requirement for a LOS MIMO set-up.

Figure 5:
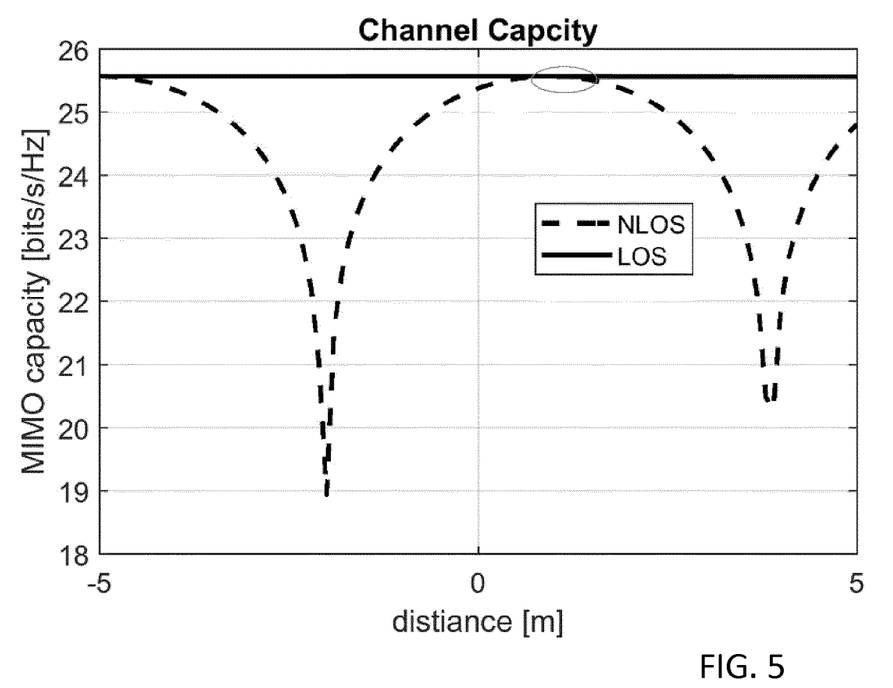
FIG. 5 is a graph showing MIMO capacity as function of distance.
Figure 6:
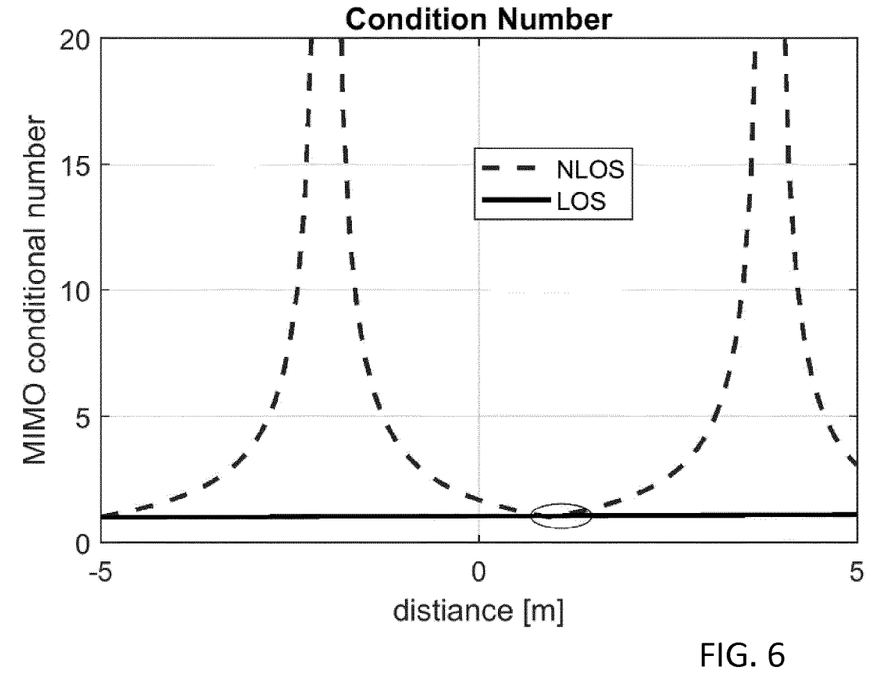
FIG. 6 is a graph showing MIMO condition number as function of distance.

FIG. 5 demonstrates the idea of how to select a robust antenna separation in which works in both LOS (solid line) and NLOS (dashed line) conditions, according to the present teaching. For simplicity, with reference to FIG. 4, the positions of 3 antennas (a2, b1', b2') are fixed, and the antenna a1 can vary in x direction. FIG. 5 illustrates MIMO capacity as function of the distance the antenna a1 has been moved in x direction. FIG. 6 illustrate condition number as function of the distance the antenna a1 has been moved in x direction.

An antenna position for antenna a1 which is suitable for both LOS and NLOS configurations has high channel capacity in both cases. Also, the condition numbers are close to 1. If there are multiple candidates, the antenna set-up which requires the smallest reflection area is preferred.

A summary of the design steps, according to aspects, is listed below:

1) Specify frequency, path length, antenna type, antenna positions

2) Specify the flexibility to move at least one antenna within a certain distance 3) Select a reflection surface, determine reflection surface size, location and angle of the normal vector to the surface.

4) Check if the surface can fulfill sufficiently the law of reflection, i.e., if the surface fulfills the requirement of location and if the normal of the surface have the right angle.

5) Determine reflection loss based on the material of the reflecting surface.

6) For each set of antenna positions:
  Calculate the LOS MIMO channel quality, such as MIMO channel capacity, MIMO gain, etc.
  Calculate the NLOS free space path loss
  Calculate the equivalent NLOS MIMO phase and the corresponding MIMO power gain
  Check the size requirement of the reflection surface
  Calculate NLOS MIMO channel quality indicators, such as channel capacity, channel gain, etc.
  Select the optimal antenna set-up which works well for both LOS and NLOS configurations. The configuration parameters, for example beam directions, location of reflection points, the corresponding system gain can be stored in the digital receiver.
  If the NLOS MIMO system gain is larger than the LOS MIMO system gain subjected to blockage, switch the beam directions towards the reflection surface.

Consequently, there is disclosed herein a method which comprises switching from a first antenna array configuration to a second antenna array configuration based on a comparison between communication conditions associated with the first and with the second configuration.

The design of the antenna position can be performed in advance, before the deployment of the radio link system. It can also be performed on site by implementing it in the digital transceiver.

According to aspects, the antenna positions of the MIMO system are adjustable over a given range, the switch between LOS MIMO and NLOS MIMO configuration, according to aspects, also includes moving the antennas to the optimized positions according to the planning.

According to aspects, if there is no LOS path between the TX and RX antennas, the antenna separation can be optimized only with respect to the NLOS paths.

According to aspects, the optimization can take additional inputs into consideration such as the channel bandwidth, the propagation channel statistics, the disturbance characteristics etc.

According to aspects, the NLOS MIMO can be designed using diffraction paths.

Figure 7:
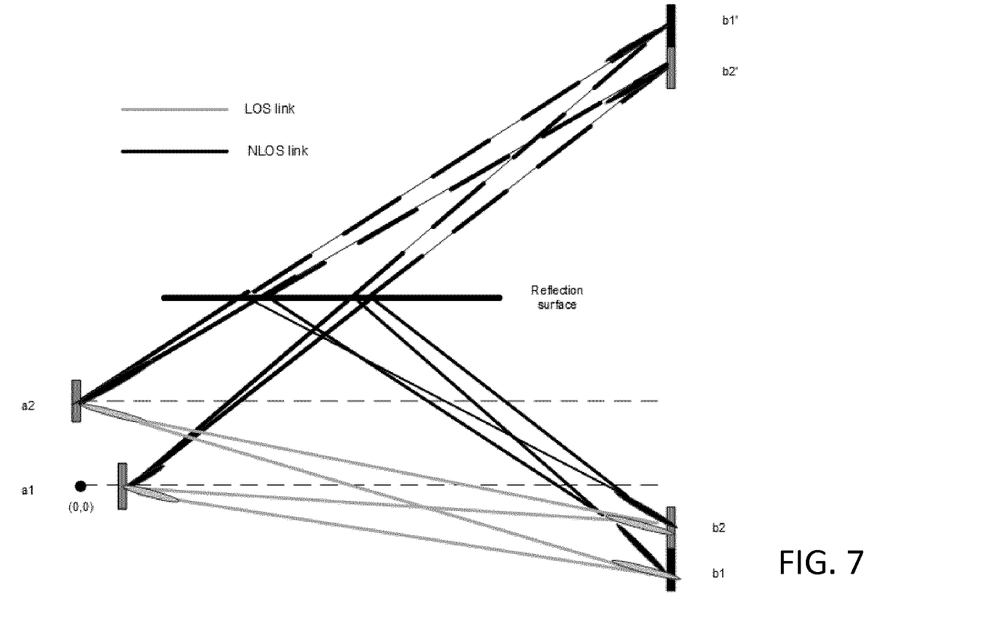
FIG. 7 shows a schematic view of a communication system.

According to aspects, with reference to FIG. 7, the LOS and NLOS paths in can be used at the same time, by for example exploiting separated antennas or antenna arrays. FIG. 7 gives an example that a compact 4×4 MIMO system consists of two 2×2 MIMO systems where one 2×2 system operates in LOS condition and one 2×2 system operates in NLOS condition. This compact 4×4 MIMO system needs less deployment space and it is also more resilient to blockings of one of the communication paths.

Figure 8:
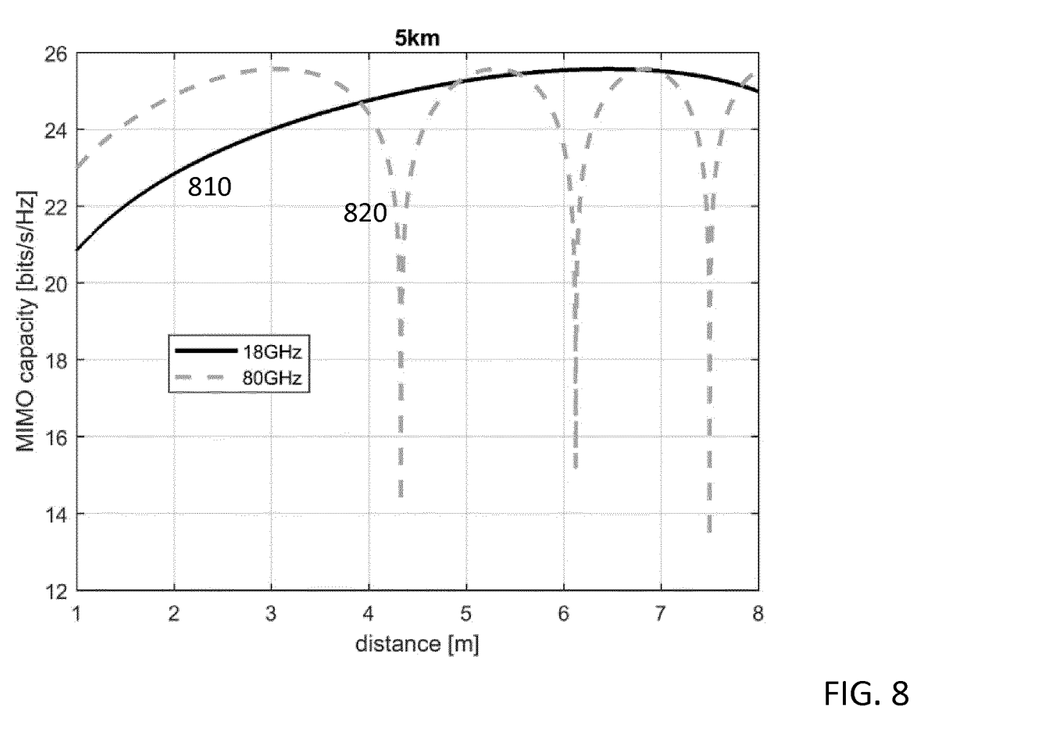
FIG. 8 is a graph showing MIMO capacity as function of distance.

The selecting of antenna geometry based on a plurality of carrier frequencies will now be discussed. FIG. 8 gives an example showing channel capacity in terms of bps/Hz for an 18 GHz link, solid line 810, and an 80 GHz link, dashed line 820, as the antenna separation increases. The path length in the example is 5 km and the antenna separation at the transmit and receive sites increases simultaneously from 1 m to 8 m. As seen in the figure the optimal distance for one carrier might be very bad for the other carrier.

For multi-carrier LOS MIMO systems, the joint optimal antenna separation depends on the optimization criterion. The performance measure can be the sum of capacity, the sum of data throughput, the combined system availability etc. The performance measure is, according to aspects, determined as a weighted sum of different performance measures. For instance, preference may be given to throughput over availability by multiplying the throughput by a larger factor than the factor for availability.

Figure 9:
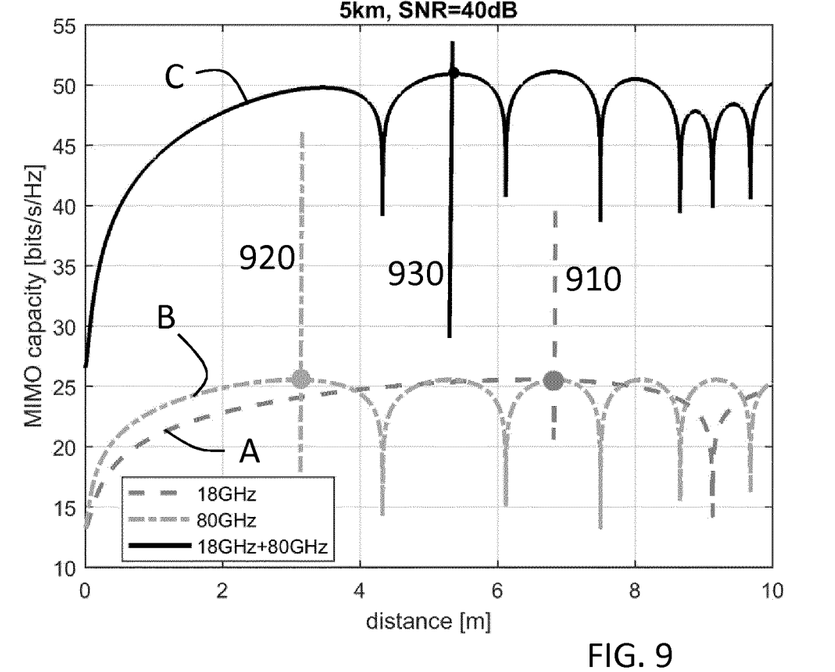
FIG. 9 is a graph showing MIMO capacity as function of distance.

FIG. 9 illustrates one solution in which the antenna arrangement for multi-band LOS MIMO is optimized with respect to the sum of channel capacity of the two links which are both 5 km long. The curves labeled as A and as B represent channel capacity for 18 GHz and 80 GHz, respectively. The curve labeled as C represents the sum capacity of the two links. In FIG. 9, the optimal antenna separation 910 for the 18 GHz link is about 6.8 m, whilst the optimal antenna separation 920 for the 80 GHz link is about 3.1 m. The optimal distance 930 for the sum of capacity is at 5.4 m, between the optimum distances of 18 GHz and 80 GHz.

Figure 10:
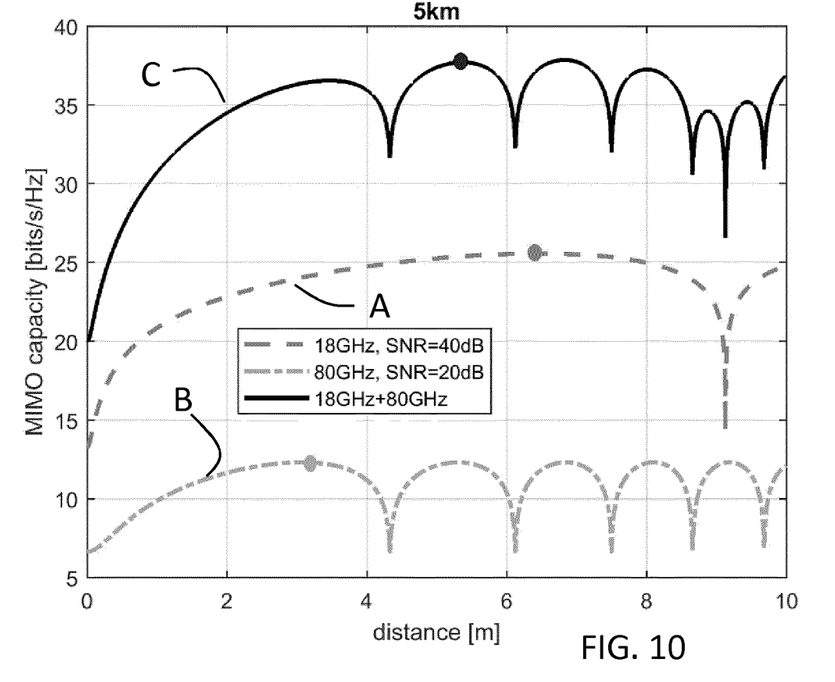
FIG. 10 is a graph showing MIMO capacity as function of distance.

The example in FIG. 9 assumes that the two links with different carrier frequencies have similar link quality. For example, similar fading margin, or in Signal-to-Noise ratio (SNR). In a more realistic deployment, the two links might have very different link conditions. It is common that a high frequency link has much lower fading margin due to the hardware limitations given by the frequency and channel bandwidth. FIG. 10 exemplifies the abovementioned situation where the two MIMO links have 20 dB difference in SNR.

Figure 11:
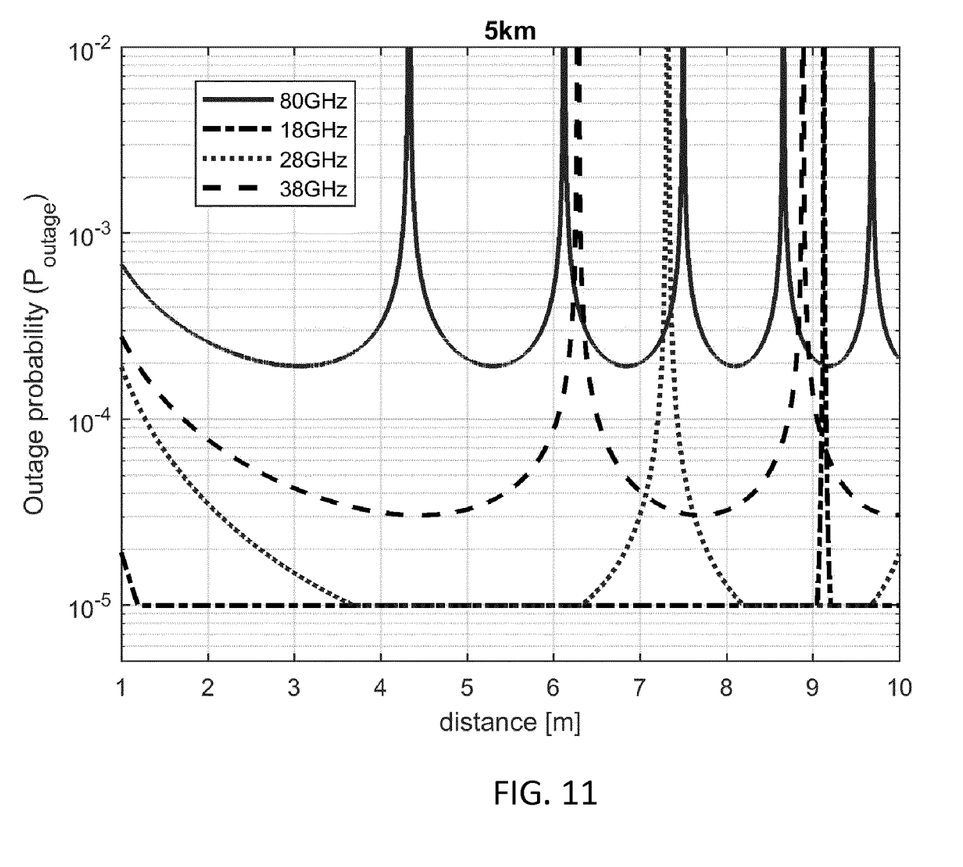
FIG. 11 is a graph showing outage probability as function of distance.

According to some aspects, the channel arrangement can be optimized with respect to the combined system availability which includes rain fading statistics, multipath fading statistics, and system parameters such as channel bandwidth, system sensitivity. FIG. 11 depicts an example of varied link outage in terms of antenna separation for different carrier frequency. The availability probability measure is related to the outage probability measure as:

$$P_{availability} = 1 - P_{outage}.$$

If the availability is the only figure of merit, the joint optimal distance will be closer to the optimum of lower carrier. In a real system, the joint optima will be a balance of system throughput and availability.

From a more practical point of view, the antenna separation will be limited by the available deployment condition, such as the length of the mast. It will be common to perform local optimization within a certain deployment range.

Figure 12:
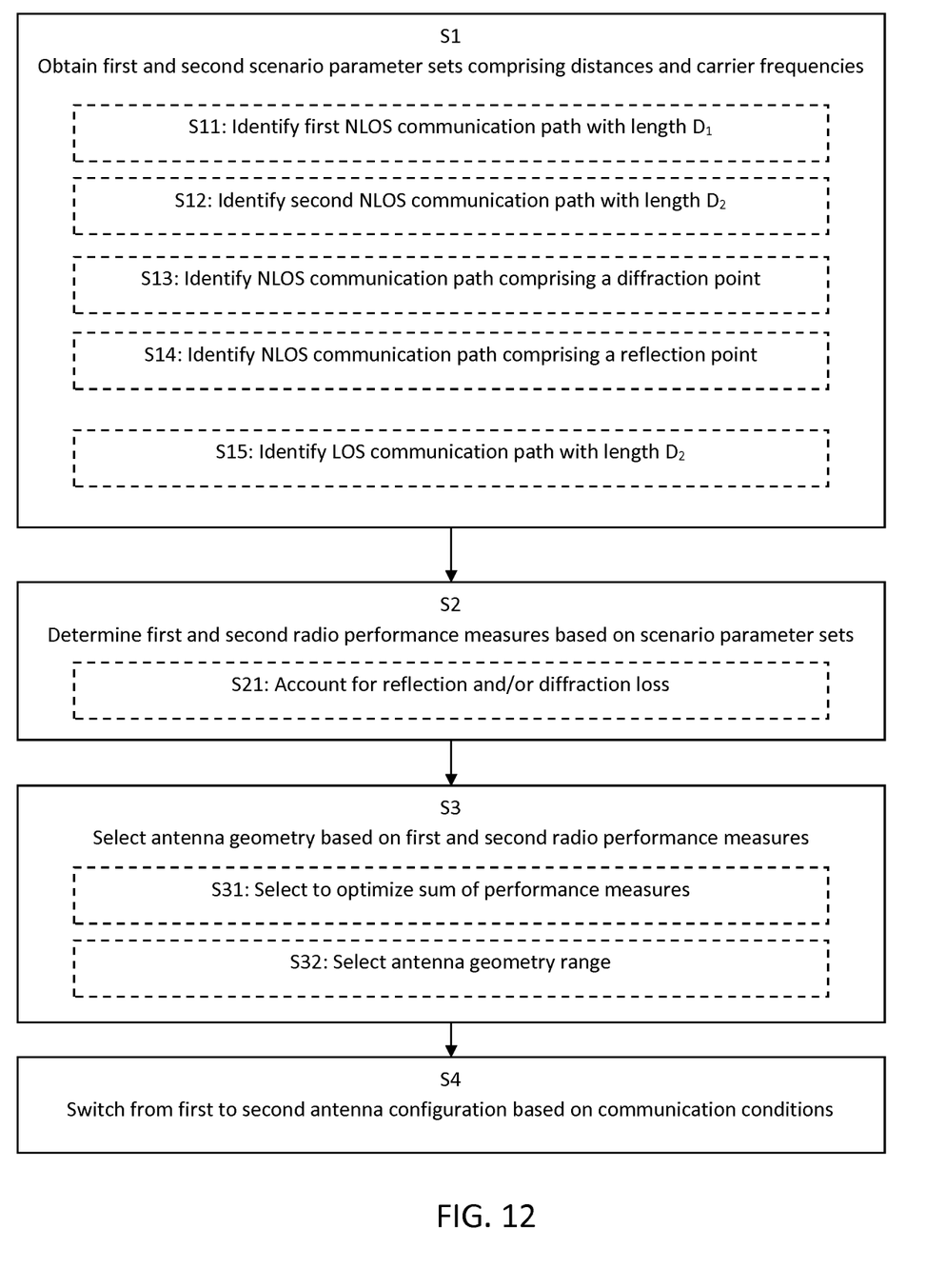
FIG. 12 shows a flowchart illustrating methods.

FIG. 12 is a flowchart illustrating methods disclosed herein, which summarize the discussions above. There is illustrated a method for selecting a geometry of an antenna array in a multiple-input multiple-output, MIMO, radio communication system 100. The MIMO system is the same system which was discussed above in connection to FIGS. 1-11. The method comprises obtaining S1 a first parameter set comprising a first communication distance $D_1$ and a first carrier frequency $f_1$, and a second parameter set comprising a second communication distance $D_2$ and a second carrier frequency $f_2$.

Thus, differently from known MIMO systems configured for a single carrier frequency and for a single communication distance, this method operates on two or more carrier frequencies and/or on two or more communication distances.

The method also comprises determining S2 a first radio communication performance measure based on the first parameter set in dependence of antenna array geometry, and a second radio communication performance measure based on the second parameter set in dependence of antenna array geometry and selecting S3 the antenna array geometry based on the first radio communication performance measure and on the second radio communication performance measure.

This way the MIMO system is arranged with an antenna array geometry configured for more than one parameter set comprising a distance and a carrier frequency. Compared to known LOS-MIMO systems which are only configured for a single distance and a single carrier frequency, the disclosed antenna geometry can be optimized for two different carrier frequencies at the same time, or for two different distances at the same time, or for two different distances and two different carrier frequencies at the same time. The disclosed method thereby provides increased throughput and/or reliability in point-to-point radio links.

According to aspects, the antenna array geometry comprises an antenna separation distance $d_t$, $d_r$. However, it is appreciated that the herein disclosed concepts extend to more general geometries defined, e.g., by antenna element coordinates in three-dimensional space. The antenna array geometry can be absolute, i.e., determined with reference to some external reference system, or it can be relative, i.e., determined with reference to one of the antenna elements.

According to aspects, a radio communication performance measure is associated with any of channel capacity, fading margin, outage probability, or data throughput. As noted above, there are a variety of communication performance measures which can be used to characterize the optimality of a MIMO channel. For example; MIMO channel capacity, MIMO channel conditional number and MIMO phase difference. At optimal antenna separation, the channel capacity is maximized; the channel condition number is 1 and the MIMO phase difference for the 2×2 system is 0. The concepts of fading margin, outage probability, and data throughput are known and will not in be discussed in detail here.

According to aspects, the selecting S3 comprises selecting S31 the antenna array geometry to optimize a sum of the first and the second radio communication performance measures. Optionally, the sum is a weighted sum which accounts for a preference towards one or some of the constituent links.

For example, the sum may be an equal weight sum, C=C1+C2, where it is desired to optimize sum capacity C, where C1 is the capacity of a first link at frequency f1 and C2 is the capacity of a second link at frequency f2.

However, the second link may have much higher bandwidth B2 than the first link bandwidth B1. So, the sum rate R=B1*C1+B2*C2, i.e., different weights/bandwidths. This is a weighted sum.

According to aspects, the first communication distance $D_1$ is different from the second communication distance $D_2$.

This case was discussed above in connection to FIGS. 4-7. Often, at least one or the communication paths then extends in a direction different from the LOS direction between the antenna arrays. By allowing for different communication path lengths in a point-to-point MIMO system, advantages of increased throughput and/or increased reliability are obtained.

Sometimes, however, two paths can extend over different distances while still being LOS paths.

According to aspects, the obtaining S1 comprises identifying S11 a first non-line-of-sight, NLOS, communication path, wherein the first communication distance $D_1$ corresponds to the path length of the first NLOS communication path.

According to aspects, the obtaining S1 comprises identifying S12 a second non-line-of-sight, NLOS, communication path, wherein the second communication distance $D_2$ corresponds to the path length of the second NLOS communication path. Thus, both communication paths extend in directions different from the LOS direction.

According to aspects, the identifying S11, S12 comprises identifying S13 an NLOS communication path comprising a diffraction point.

According to aspects, the identifying S11, S12 comprises identifying S14 an NLOS communication path comprising a reflection point.

Diffraction and reflection effects are known phenomena in radio propagation and will not be discussed in more detail here.

According to aspects, the determining S2 comprises accounting S21 for a diffraction loss and/or a reflection loss associated with NLOS propagation. Thus, when evaluating and comparing communication links, any losses incurred by reflection or diffraction is accounted for in the analysis.

According to aspects, the obtaining S1 comprises identifying S15 a line-of-sight communication path, wherein the second communication distance $D_2$ corresponds to the path length of the LOS communication path. Thus, this system uses a LOS path and an NLOS path for communication. The antenna geometry is selected to allow MIMO communication over both paths.

According to aspects, the first carrier frequency $f_1$ and the second carrier frequency $f_2$ are different carrier frequencies corresponding to different communication frequency bands. This case was discussed above in connection to FIGS. 8-11. The antenna geometry is selected to allow MIMO communication over both frequency bands corresponding to the two different carrier frequencies.

According to aspects, the first carrier frequency $f_1$ is below 32 GHz, and the second carrier frequency $f_2$ is above 32 GHz.

According to aspects, the selecting S3 comprises selecting S32 a range of an adjustable antenna geometry. Optionally, the antenna positions are adjustable, mechanically or electrically, manually or automatically, within a certain range to allow for adjusting antenna geometry within a range of geometries.

According to aspects, the antenna array geometry comprises first and second antenna configurations corresponding to the first and to the second scenario parameter sets, respectively, wherein the method comprises switching S4 from to the first configuration to the second configuration based on a comparison between communication conditions associated with the first and with the second configuration.

According to aspects, the first and the second parameter sets comprise any of; radio communication channel bandwidth, radio propagation channel characteristics, and outage statistics.

According to aspects, the antenna array comprises dual-band antenna elements configured to operate at the first carrier frequency $f_1$ and at the second carrier frequency $f_2$.

According to aspects, the method also comprises obtaining a plurality of parameter sets, where each set comprises a communication distance and a carrier frequency, determining radio communication performance measures based on the parameter sets in dependence of antenna array geometry, and selecting the antenna array geometry based on the communication performance measures.

Figure 13:
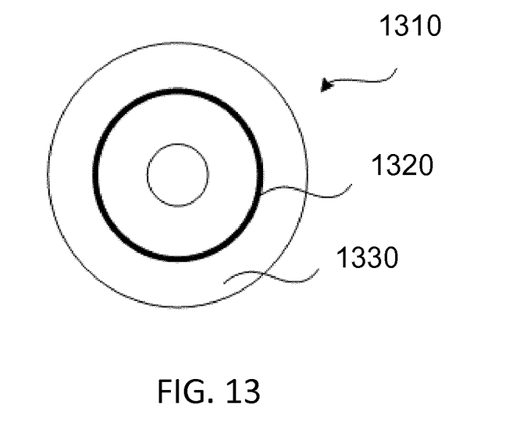
FIG. 13 schematically illustrates a computer readable medium.

FIG. 13 schematically illustrates a computer readable medium 1330. The various aspects of the methods and techniques described herein are described in the general context of method steps or processes, which may be implemented in one aspect by a computer program product 1310 embodied in a computer-readable medium 1330, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc., that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Figure 14:
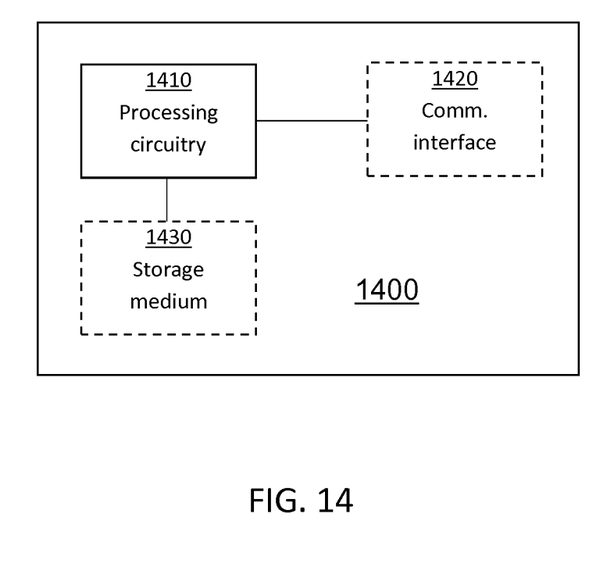
FIG. 14 schematically illustrates an antenna array according to aspects of the present disclosure.

Consequently, there is disclosed herein a computer program 1320 for selecting a geometry of an antenna array in a MIMO radio communication system 100, the computer program comprising computer code which, when run on processing circuitry 1410 of an antenna configuration device 1400, causes the configuration device to execute one or more of the methods discussed in connection to FIG. 12.

There is also disclosed herein a computer program product 1310 comprising the computer program 1320, and a computer readable storage medium 1330 on which the computer program is stored.

FIG. 14 schematically illustrates, in terms of a number of functional units, the components of an antenna configuration device 1400 according to an embodiment of the above discussions. Processing circuitry 1410 is provided using any combination of one or more of a suitable central processing unit CPU, multiprocessor, microcontroller, digital signal processor DSP, etc., capable of executing software instructions stored in a computer program product, e.g. in the form of a storage medium 1430. The processing circuitry 1410 may further be provided as at least one application specific integrated circuit ASIC, or field programmable gate array FPGA.

Particularly, the processing circuitry 1410 is configured to cause the antenna configuration device 1400 to perform a set of operations, or steps. For example, the storage medium 1430 may store the set of operations, and the processing circuitry 1410 may be configured to retrieve the set of operations from the storage medium 1430 to cause the antenna configuration device 1400 to perform the set of operations. The set of operations may be provided as a set of executable instructions. Thus, the processing circuitry 1410 is thereby arranged to execute methods as herein disclosed.

The storage medium 1430 may also comprise persistent storage, which, for example, can be any single one or combination of magnetic memory, optical memory, solid state memory or even remotely mounted memory.

The antenna configuration device 1400 may further comprise a communications interface 1420 for communications with at least one external device. As such the communication interface 1420 may comprise one or more transmitters and receivers, comprising analogue and digital components and a suitable number ports for wireline or wireless communication.

The processing circuitry 1410 controls the general operation of the antenna configuration device 1400 e.g. by sending data and control signals to the communication interface 1420 and the storage medium 1430, by receiving data and reports from the communication interface 1420, and by retrieving data and instructions from the storage medium 1430. Other components, as well as the related functionality, of the antenna configuration device 1400 are omitted in order not to obscure the concepts presented herein. The antenna configuration device 1400 is thereby arranged to support planning of microwave radio links, backhaul systems, and communication networks.

The invention claimed is:

1. A method for selecting a geometry of an antenna array in a multiple-input multiple-output (MIMO) radio communication system, the method comprising;
   obtaining a first parameter set comprising a first communication distance and a first carrier frequency, and a second parameter set comprising a second communication distance and a second carrier frequency;
   determining a first radio communication performance measure based on the first parameter set in dependence of antenna array geometry, and a second radio communication performance measure based on the second parameter set in dependence of antenna array geometry; and
   selecting the antenna array geometry based on the first radio communication performance measure and on the second radio communication performance measure;
   wherein the selecting comprises selecting the antenna array geometry to optimize a sum of the first and the second radio communication performance measures.

2. The method of claim 1, wherein the antenna array geometry comprises an antenna separation distance.

3. The method of claim 1, wherein a radio communication performance measure is associated with channel capacity, fading margin, outage probability, and/or data throughput.

4. The method of claim 1, wherein the first communication distance is different from the second communication distance.

5. The method of claim 1, wherein the obtaining comprises identifying a first non-line-of-sight (NLOS) communication path; wherein the first communication distance corresponds to a path length of the first NLOS communication path.

6. The method of claim 1, wherein the obtaining comprises identifying a second non-line-of-sight (NLOS) communication path; wherein the second communication distance corresponds to a path length of the second NLOS communication path.

7. The method of claim 5, wherein the identifying comprises identifying an NLOS communication path comprising a diffraction point.

8. The method of claim 5, wherein the identifying comprises identifying an NLOS communication path comprising a reflection point.

9. The method of claim 4, wherein the determining comprises accounting for a diffraction loss and/or a reflection loss associated with non-line-of-sight (NLOS) propagation.

10. The method of claim 1, wherein the obtaining comprises identifying a line-of-sight (LOS) communication path; wherein the second communication distance corresponds to the path length of the LOS communication path.

11. The method of claim 1, wherein the first carrier frequency and the second carrier frequency are different carrier frequencies corresponding to different communication frequency bands.

12. The method of claim 1, wherein the first carrier frequency is below 32 GHz and the second carrier frequency is above 32 GHz.

13. The method of claim 1, wherein the selecting comprises selecting a range of an adjustable antenna geometry.

14. The method of claim 1:
    wherein the antenna array geometry comprises first and second antenna configurations corresponding to the first and to the second parameter sets, respectively;
    wherein the method comprises switching from the first configuration to the second configuration based on a comparison between communication conditions associated with the first and second configurations.

15. The method of claim 1, wherein the first and the second parameter sets comprise: radio communication channel bandwidth, radio propagation channel characteristics, and/or outage statistics.

16. The method of claim 1, wherein the antenna array comprises dual-band antenna elements configured to operate at the first carrier frequency and at the second carrier frequency.

17. The method of claim 1, wherein the method comprises:
    obtaining a plurality greater than two of parameter sets, where each set comprises a communication distance and a carrier frequency;
    determining radio communication performance measures based on the parameter sets in dependence of antenna array geometry; and
    selecting the antenna array geometry based on the communication performance measures.

18. A non-transitory computer readable recording medium storing a computer program product for selecting a geometry of an antenna array in a multiple-input multiple-output (MIMO) radio communication system, the computer program product comprising program instructions which, when run on processing circuitry of a configuration device, causes the configuration device to:
    obtain a first parameter set comprising a first communication distance and a first carrier frequency, and a second parameter set comprising a second communication distance and a second carrier frequency;
    determine a first radio communication performance measure based on the first parameter set in dependence of antenna array geometry, and a second radio communication performance measure based on the second parameter set in dependence of antenna array geometry; and
    select the antenna array geometry based on the first radio communication performance measure and on the second radio communication performance measure;
    wherein the selecting comprises selecting the antenna array geometry to optimize a sum of the first and the second radio communication performance measures.

19. An antenna array for a multiple-input multiple-output (MIMO) radio communication system; the antenna array being arranged for radio communication over a first communication distance at a first carrier frequency, and over a second communication distance at a second carrier frequency; the antenna array comprising:
    a plurality of antennas;
    wherein a geometry of the antenna array is selected based on a first radio communication performance measure and on a second radio communication performance measure, wherein the selecting comprises selecting the antenna array geometry to optimize a sum of the first and the second radio communication performance measures; wherein the first radio communication performance measure is determined based on the first communication distance and on the first carrier frequency, and the second radio communication performance measure is determined based on the second communication distance and on the second carrier frequency.

* * * * *